Dec. 31, 1963 E. B. NOLT ETAL 3,115,823
HAY BALER
Filed Aug. 27, 1962 5 Sheets-Sheet 1
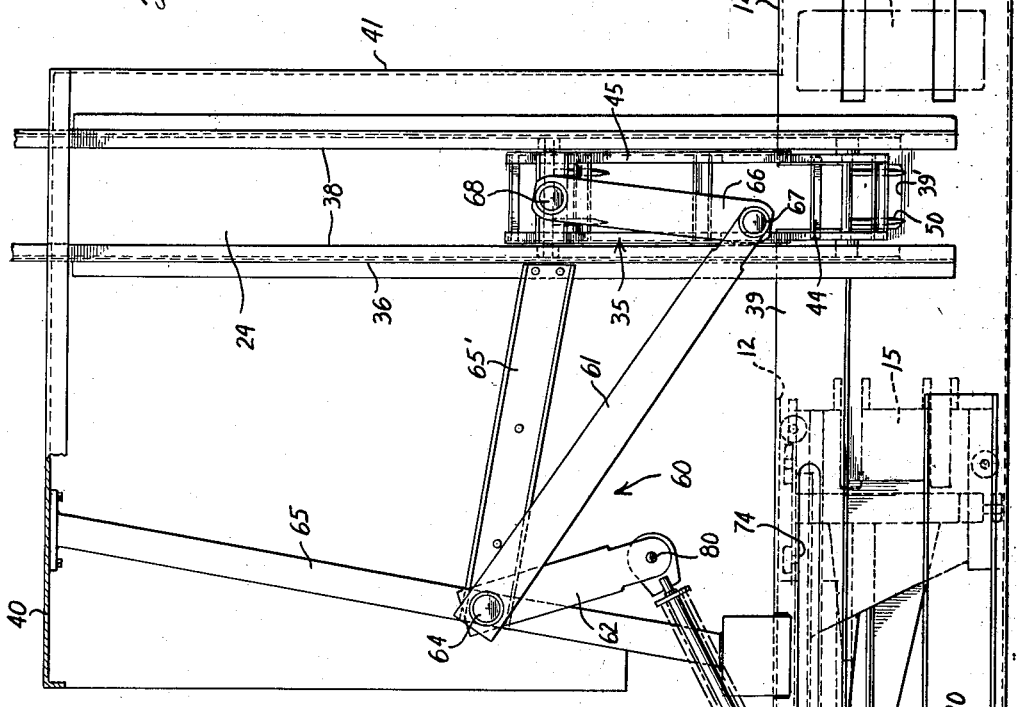
Fig. 1.
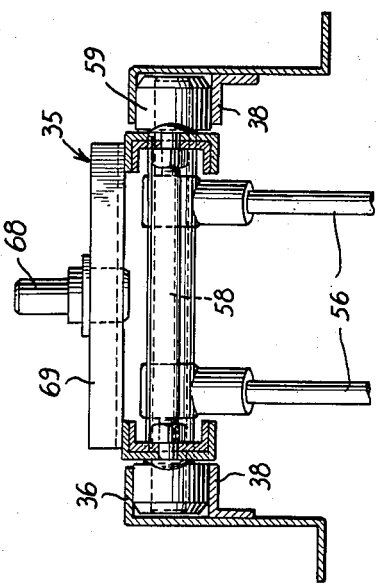
Fig. 9.
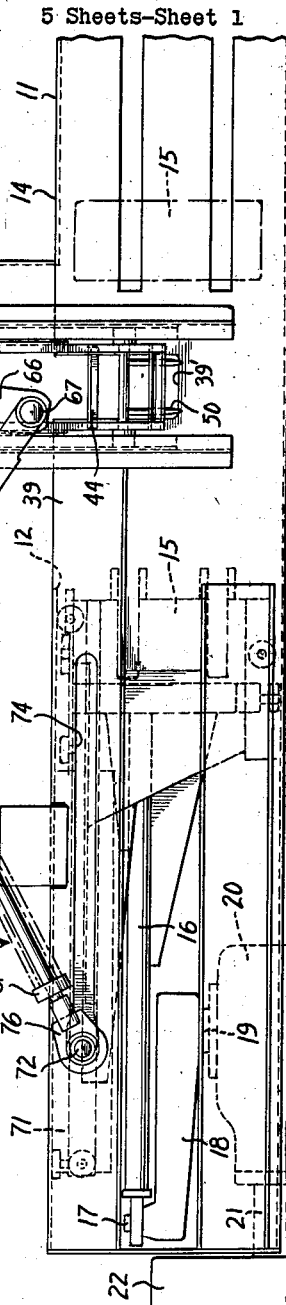
INVENTORS
EDWIN B. NOLT
JAMES W. MC DUFFIE
BY
*Joseph A. Brown*
ATTORNEY

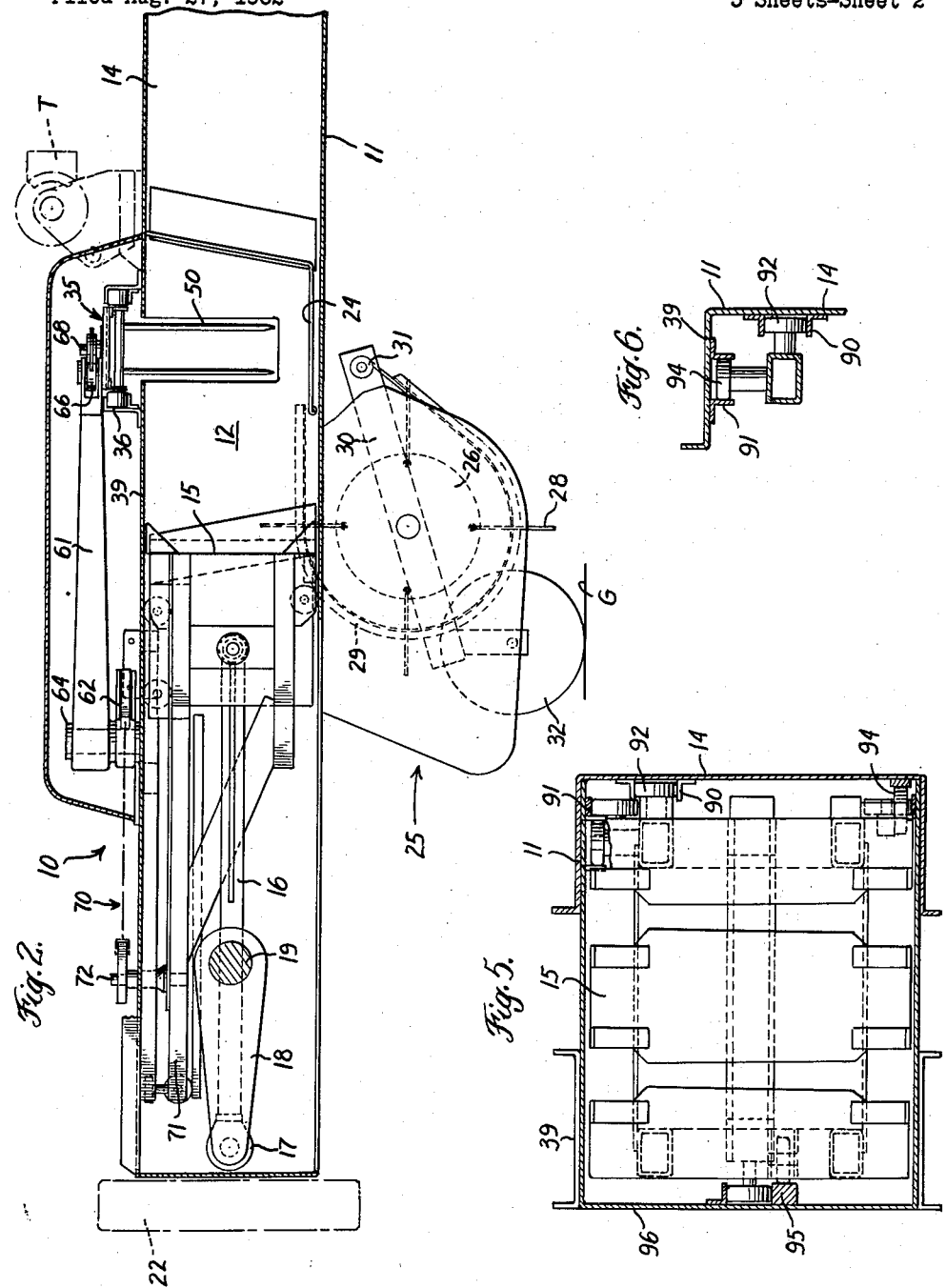

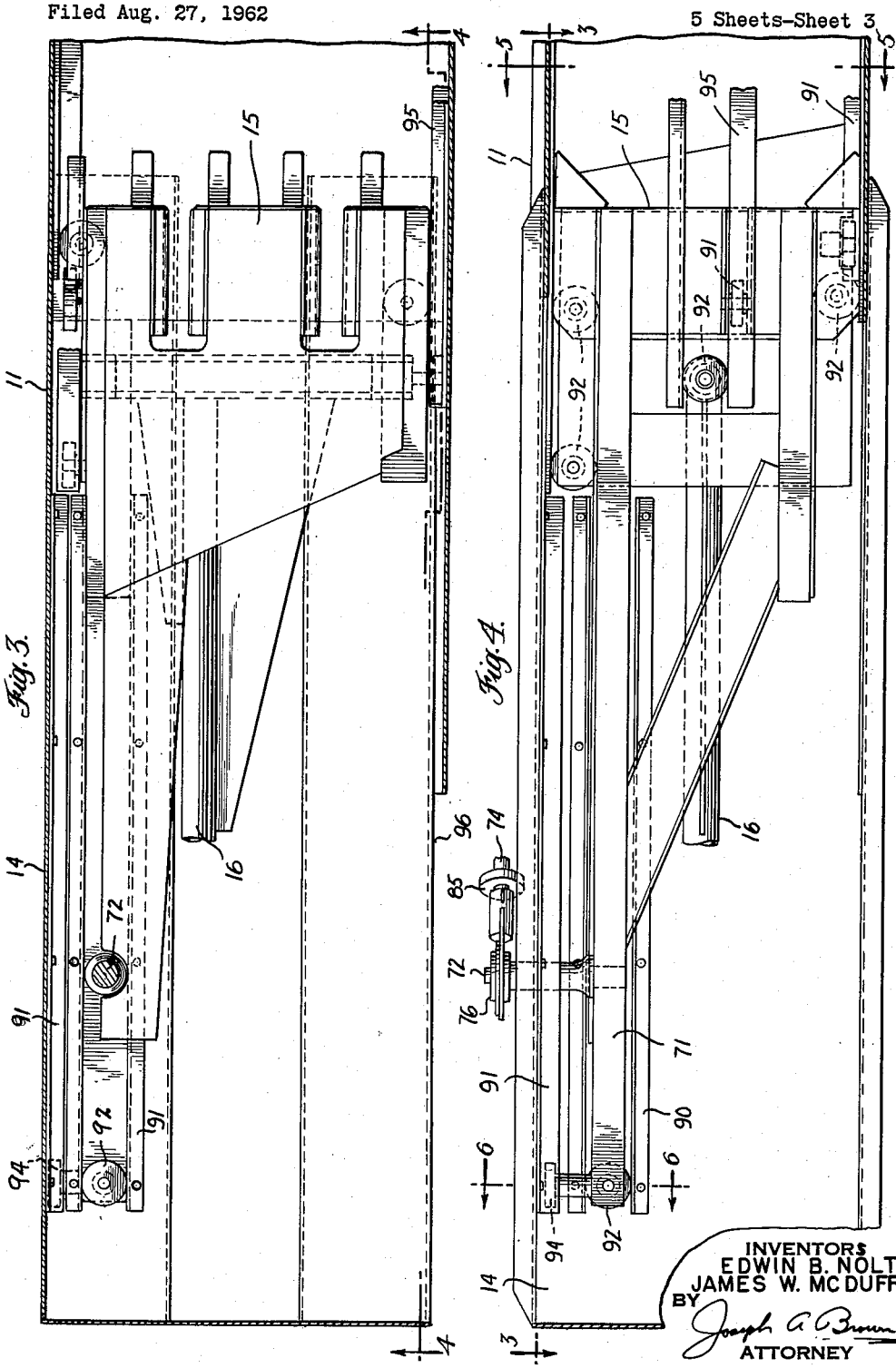

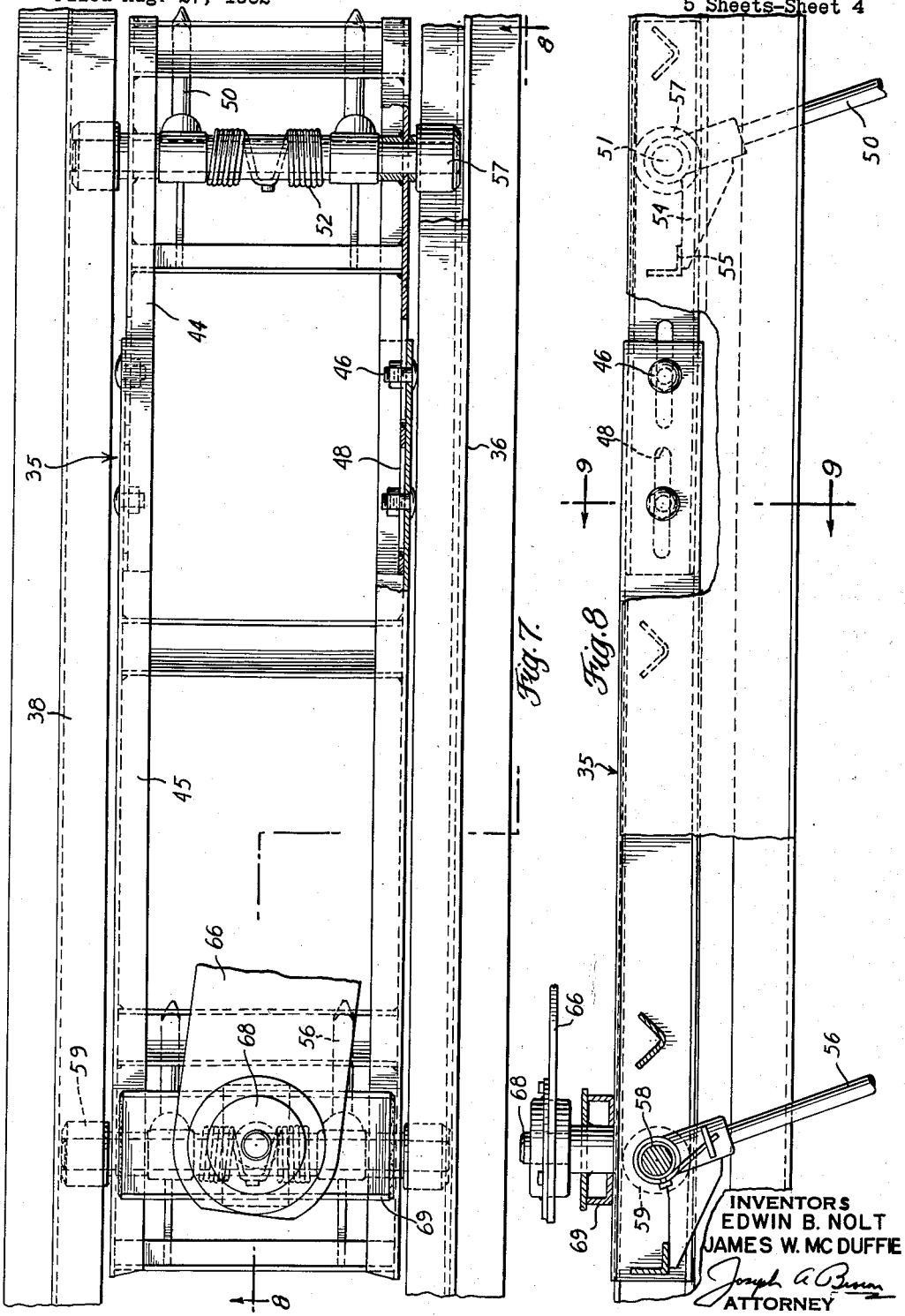

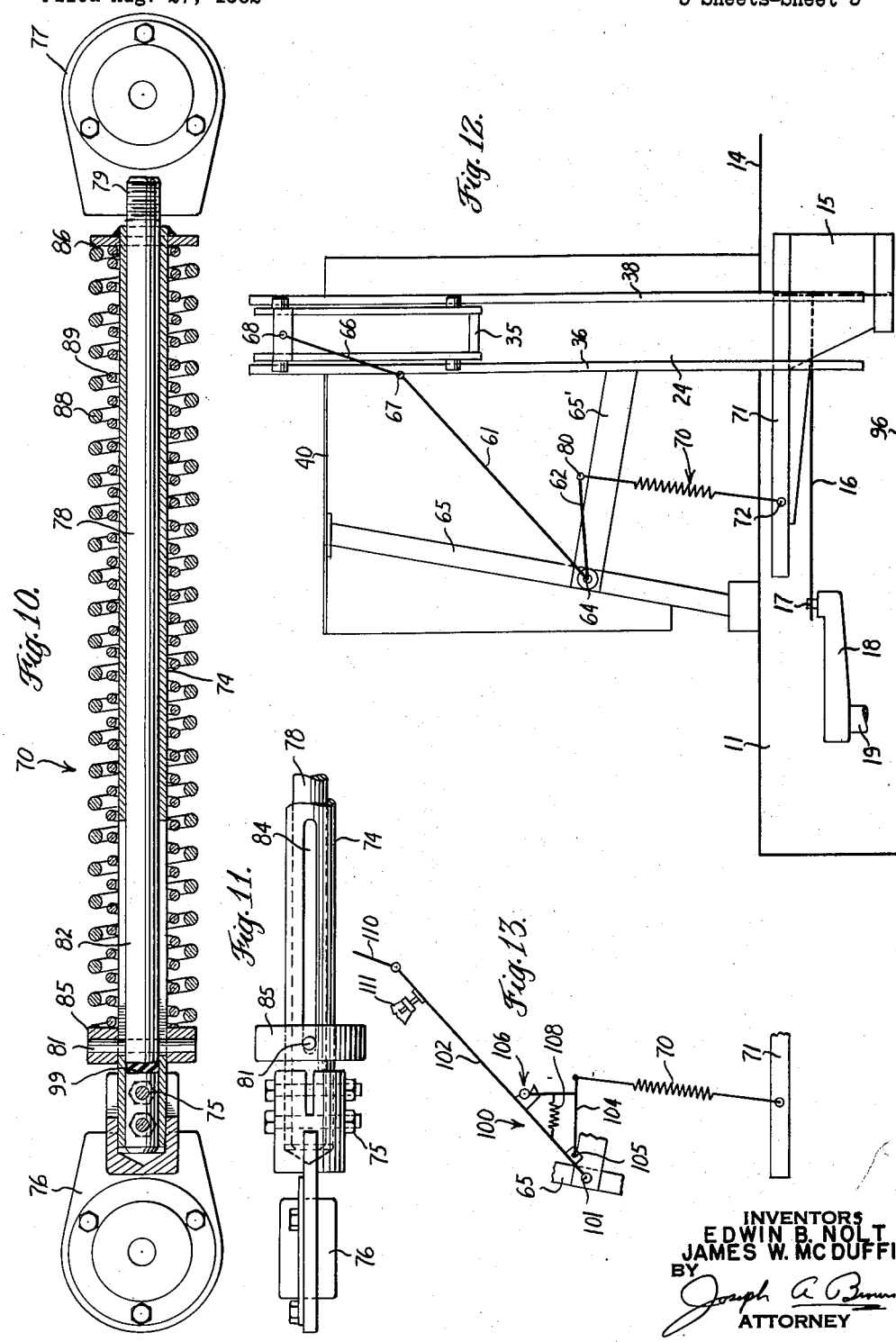

United States Patent Office 3,115,823
Patented Dec. 31, 1963

3,115,823
HAY BALER
Edwin B. Nolt and James W. McDuffie, New Holland, Pa., assignors to Sperry Rand Corporation, New Holland, Pa., a corporation of Delaware
Filed Aug. 27, 1962, Ser. No. 219,623
11 Claims. (Cl. 100—142)

Heretofore, a hay baler has been provided having a fore-and-aft extending bale chamber in which a plunger is reciprocal to compress hay deposited therein into bales. The bale chamber has an opening in a side wall thereof and the plunger moves from a retracted position forwardly of the opening to an extended position rearwardly of the opening on each working stroke. Hay is delivered to the bale chamber through the side wall opening and between successive working strokes of the plunger. A track extends transversely to the bale case and above a hay receiving platform on which hay is deposited from a pickup mechanism. A feeder carriage is operable on the track to engage the hay and convey it transversely of the platform and into the bale chamber. The feeder carriage has depending feed fingers which stand erect on a feeding stroke and lay back on a return stroke. The carriage travels in a rectilinear direction perpendicular to the reciprocations of the plunger.

For driving the feeder carriage in timed relation with the plunger, a first endless chain has been provided heretofore which extends in a fore-and-aft direction. The chain is directly connected to the plunger so that when the plunger is reciprocated the chain is oscillated. Such chain extends around a drive sprocket which in turn drives a vertical shaft having another sprocket to which a transversely extending second chain is connected. The transverse chain extends parallel to the feeder carriage and one reach of the chain is connected thereto. Thus, the first chain oscillates the second chain and the second chain imparts the drive to the feeder carriage. Since the drive is directly from the plunger, the baler feeder operates in precise timed relation to the plunger.

One object of this invention is to provide in a baler of the character described drive means for the baler feeder which provides improved timing and clearance characteristics relative to a plunger with which the feeder is operable.

Another object of this invention is to provide a drive means for a baler feed mechanism, which means includes adjustable structure for varying the penetration of the feeder into the bale case on each working stroke.

Another object of this invention is to provide a hay baler feeder drive means of improved construction having fewer parts than required heretofore and thus presenting less maintenance and repair problems.

A further object of this invention is to provide a hay baler feeder drive means of the character described which incorporates yieldability to provide a metered feeding of material into the bale case, the yieldable structure occupying a small space and having nevertheless the desired resilient characteristics.

A still further object of this invention is to provide a feeder structure capable of adjustment to vary the amount of penetration of the feed fingers into the bale chamber on each working stroke of the feeder.

Other objects of this invention will be apparent hereinafter from the specification and from the recital in the appended claims.

In the drawings:

FIG. 1 is a fragmentary plan view of a portion of a hay baler having a feeder mechanism and drive therefor constructed according to this invention, the feeder being shown at the end of a working stroke and the baler plunger retracted;

FIG. 2 is a longitudinal vertical section taken substantially medially through the bale case but with the plunger in elevational view and diagrammatically showing also the pickup structure of the baler;

FIG. 3 is an enlarged plan view of the plunger with the bale case in horizontal section and taken generally on the line 3—3 of FIG. 4;

FIG. 4 is a side view of the plunger with the bale case in vertical section and taken on the line 4—4 of FIG. 3;

FIG. 5 is an end view of the plunger with the bale case in transverse section and taken on the line 5—5 of FIG. 4;

FIG. 6 is a fragmentary section of the forward end of the plunger structure and taken on the line 6—6 of FIG. 4;

FIG. 7 is an enlarged plan view of the carriage of the feeder mechanism and showing in particular the two sections of the carriage and the adjustable means for connecting the sections;

FIG. 8 is a part elevational view, part section and taken generally on the lines 8—8 of FIG. 7 looking in the direction of the arrows;

FIG. 9 is a section taken on the line 9—9 of FIG. 8 looking in the direction of the arrows;

FIG. 10 is an enlarged longitudinal section of one of the links employed in the feeder drive mechanism;

FIG. 11 is an elevational view of the left end portion of the link shown in FIG. 10, but with the springs removed;

FIG. 12 is a diagrammatic view showing the feeder and drive structure in plan as illustrated in FIG. 1 but with the feeder carriage in retracted position and the plunger at the end of a working stroke; and FIG. 13 is a diagrammatic plan view of a feeder drive means constructed according to another embodiment of this invention.

Referring now to the drawings by numerals of references, and particularly to FIGS. 1 and 2, 10 denotes generally a hay baler having a fore-and-aft extending bale chamber 11 provided with a feed opening 12 in a side wall 14 thereof. Mounted in bale chamber 11 and reciprocable longitudinally therein is a bale forming plunger 15 which is movable from a retracted position forwardly of the feed opening 12 as shown in FIG. 1 to an extended position rearwardly of the opening as shown in FIG. 12. The plunger is reciprocated by means of a connecting rod 16 pivotally connected at 17 to a crank arm 18 driven from a gear box 20. The gear box has an output shaft 19 on which the crank arm 18 is carried and an input shaft 21 which receives power from means including a flywheel 22. The source of power for operating the plunger may be from a power take-off connection to the tractor, used in towing the baler, or by means of an engine mounted on the baler structure.

Extending laterally from side wall 14 of bale case 11 is a hay receiving platform 24 which communicates with feed opening 12 and extends from the lower portion thereof. As shown in FIG. 2, hay is adapted to be picked up from the ground G by means of a pickup mechanism 25 having a reel 26 rotatable in a clockwise direction. The reel carries tines or fingers 28 which sweep engaged crop material upwardly and rearwardly across guides and stripper plates 29 for ultimate deposit on feed platform 24. The pickup is supported on frame member 30 pivotal at 31 so that the pickup may move up and down responsive to changes in the condition of the ground being travelled. A guide wheel 32 is provided to guide the pickup in its operation.

Hay deposited on the feed platform 24 is adapted to be fed into bale chamber 11 by a feeder mechanism comprising a carriage 35 reciprocable over a track 36. Track 36 comprises spaced apart rails 38 which extend parallel to each other and transverse to the extension of the bale case 11. At one end, the rails are mounted on and supported by the top wall 39 of the bale chamber 11. The opposite ends of the rails are supported on upright side wall 40 substantially laterally spaced from bale case wall 14. Walls 14 and 40 provide a passage opened forwardly to receive the hay from the pickup 25. A back wall 41 restricts the movement of hay rearwardly of the platform 24. The hay is thus confined in a chamber defined by platform 24, rear wall 41, outside wall 40, bale case side wall 14, and the feeder carriage 35 is located above it.

Carriage 35 is adapted to reciprocate rectilinearly along track 36 to sweep hay deposited on the platform 24 into the bale chamber 11. As shown best in FIGS. 7 and 8, the carriage has a front section 44 and a rear section 45 interconnected by bolts 46 which pass through slots 48 elongated in a direction transverse to the bale chamber. By loosening the nuts on the bolts 46, the front section 44 of the carriage 35 can be adjusted toward or away from the bale case 11. In this way, the length of the carriage can be regulated.

The front section 44 of the carriage pivotally supports a pair of depending feed fingers 50 swingable about support shaft 51. When viewed as shown in FIG. 8, the feed fingers 50 are free to pivot in a counterclockwise direction against the slight resistance of spring 52. Pivoting of the fingers in a clockwise direction is limited by a tab 54 engageable with stop 55 comprising part of the framework of the carriage 35. On each working stroke of the carriage, the feed fingers 50 pass into the bale chamber 11, depending through opening 39'. The amount of penetration past side wall 14 depends upon the particular adjusted position of the front section 44 of the carriage relative to the remote section 45. Such remote section also carries a pair of depending feed fingers 56 carried on a cross shaft 58. Fingers 56 are supported and operative in the same manner as fingers 50, being limited in clockwise pivoting but yieldably free to pivot in the opposite direction. Because of the tabs on the fingers 50 and 56, they are caused to extend substantially vertically on a feeding stroke of the feeder carriage 35. However, on a return stroke, the fingers will engage hay resting on the platform 24 and such engagement will cause them to pivot in a counterclockwise direction and ride over the hay rather then push it away from the bale chamber. On the next working stroke, the fingers will swing downwardly to engage the hay on the platform and to move it toward the bale chamber.

To provide smooth travel of carriage 35 over track 36, shaft 51 on front carriage section 44 has rollers 57 and shaft 58 on rear carriage section 45 has rollers 59.

For reciprocating carriage 35, a drive is provided comprising a bell crank 60 having a leg 61 and a leg 62 angularly disposed relative to each other as shown best in FIG. 1. The bell crank 60 is pivotally mounted at 64 on a support 65 which extends from a side wall 14 of bale case 11 to the wall 40 on the outside of the pickup structure, and a brace 65' extending from support 65 to track 36. The axis of pivot 64 is vertical and legs 61 and 62 of the bale crank swing in generally horizontal planes.

A first link 66 is pivotally connected at 67 to bell crank 61 and the opposite end of the link is pivotally connected to the remote section 45 of carriage 35. The connection comprises a pivot pin 68 FIG. 9 which extends upwardly from a bracket 69 substantially in vertical register with shaft 58 on which the rear fingers 56 are carried. The other bell crank leg 62 is connected by a second link 70 to plunger 15. The plunger has a forward extension 71 having a pivot pin 72 projecting upwardly through a longitudinal slot 74 in the top wall 39 of the bale case 11.

The construction of the second link arm is best shown in FIG. 10. A sleeve 74 is provided and connected by bolts 75 to a bearing structure 76 which connects to the plunger pivot pin 72. Extending in sleeve 74 is a rod 78 having an outwardly projecting portion 79 which threads into bearing mounting 77 which connects at 80 to bell crank leg 62. The threaded connection at 79 provides means for regulating the length of the second link arm 70 and thus the driving connection of the bell crank 62 to the plunger 15.

The rod 78 has a transverse pin 81 at its inner end. Such pin projects radially outwardly from the rod and through longitudinal, diammetrically opposed slots 84 in sleeve 74. Surrounding sleeve 74 is a collar 85 which is slidable on the sleeve but is fixedly connected to rod 78 by pin 81. The opposite end of sleeve 74 carries a stop-washer 86 which is welded thereon. Interposed between collar 85 and stop-washer 86 are two compression springs 88 and 89. Spring 88 is a larger diameter and stronger spring than spring 89. As shown, spring 89 is located inside of spring 88 and both cooperate to exert a strong holding force on rod 78 and resist outward movement of the rod relative to sleeve 74. Also as shown, the two springs are oppositely wound so that their coils will not interfere with each other when link 70 is extended and/or retracted. This structure provides a spring arrangement capable of large working loads in a compact space.

With this structure, when the plunger 15 is reciprocated, it operates through the second link 70 to oscillate bell crank 60. The oscillation of the bell crank 60 operates through the link 66 to reciprocate carriage 35. Thus, carriage 35 is reciprocated in precise timed relation to plunger 15 and operative to convey hay into the bale chamber 11 between each working stroke of the plunger. As shown in FIG. 1, leg 62 is generally perpendicular to bale chamber 11 when carriage 35 is at the end of a working stroke. When the carriage is retracted, FIG. 12, leg 62 extends generally parallel to the bale chamber. This arrangement, along with the adjustability in second link 70 and also in the carriage 35 enables the feeder to operate in close relationship with the plunger 15. Clearance problems are minimized and optimum feeding characteristics are obtained.

After an appropriate amount of hay has been delivered to bale chamber 11 and formed into a bale, it is banded with a suitable tying medium and the strands are tied by a mechanism indicated in dotted lines T, FIG. 2.

Since the loads encountered on feeding hay material into the bale chamber 11 are transmitted through the bell crank 60 to plunger 15, it is necessary that the plunger be suitably guided in its reciprocating movements so that the plunger will not turn from straight line travel. See FIGS. 3–5. For this purpose, bale case 11 is provided with side rails 90 and top and bottom rails 91. As shown in FIG. 6, the plunger has rollers 92 which rotate about a horizontal axis for travel on rails 90 and other rollers 94 which rotate about a vertical axis and against rails 91. Thus, forces in both a vertical and horizontal direction are resisted. The side rail indicated at 95 is mounted on the wall 96 bale chamber 11 and vertically adjustable relative thereto so that the plunger may be properly aligned and positioned in the bale case 11. Structure similar to that employed here is shown in more detail in application Serial No. 89,765, filed February 16, 1961, now Patent No. 3,059,569.

Since no chains are provided in the drive from the plunger to feeder carriage 35, wear problems are minimized. The drive structure is rugged and the adjustability provided both by the second link 70 and in the carriage 35, enables the establishment of proper and desired timing between the feeder and the baler plunger. With the structure employed, a simple drive means is provided for changing a straight line drive motion to an oscillatory motion and then back again to a straight line motion. The arrangement gives a substantial amount of versatility in the design and other features which are not present when other drive means are employed.

After link 70 has been extended on a given feeding stroke of feeder carriage 35, springs 88 and 89 will return the parts to original position on the next return stroke. To cushion such return, a resilient stop 99 may be provided as shown in FIG. 10 to be engaged by the inner end of rod 78.

In FIG. 13, there is shown a bell crank drive constructed according to another embodiment of this invention. A bell crank 100 is employed which is pivotally mounted at 101 on transverse support member 65. One leg of the bell crank is indicated at 102 and the other leg at 104. Instead of being rigidly connected to each other, at a given angular disposition, the legs are adapted to be pivoted away from each other if an overloading situation results. For this purpose, the leg 104 is pivotally connected at 105 to the bell crank leg 102. Holding the respective legs in normal proper position is releasable latch means 106 held by a spring 108. If the feeding of hay into the bale chamber produces an overloading situation, a force is transmitted by link 110 to the bell crank structure and the latch 106 releases so that the legs 102 and 104 may pivot away from each other. A stop 111 is provided to limit pivoting movement of leg 102 in one direction. Stop 111 also provides means for a positive "hookup" of latch 106 on stroke after disconnect. As with the structure previously described, the leg 104 of the bell crank is connected to the rearward extension 71 of plunger 15 by a link 70 which may be similar to that shown in FIG. 10.

While this invention has been described in connection with two embodiments thereof, it will be understood that it is capable of further modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A hay baler comprising a fore-and-aft extending bale chamber having a feed opening in one side wall thereof, a plunger reciprocal in said bale chamber from a retracted position forwardly of said opening to an extended position rearwardly thereof, a hay receiving platform extending laterally from said one side wall, a track mounted above said platform and bale chamber and extending transverse to the bale chamber, a feeder carriage mounted on said track and movable rectilinearly thereover toward and away from said bale chamber, said carriage having a front section toward said bale chamber and a section remote therefrom, hay engageable fingers depending from said carriage and mounted to extend generally vertically when said carriage is moved toward said bale chamber and to pivot to an inclined position on movement of the carriage away from the bale chamber, a bell crank having legs extending in a generally horizontal plane for swinging movement about a vertical axis, means pivotally mounting said bell crank, said mounting means being located spaced from said bale chamber one side wall and above said platform, a first link having one end pivotally connected to said carriage and an opposite end pivotally connected to one leg of said bell crank, a second link connecting the other leg of said bell crank to said plunger, said second link comprising an elongated sleeve having one end pivotally connected to said plunger, a rod projecting into said sleeve and having an outwardly projecting end pivotally connected to said bell crank other leg, said sleeve having a pair of longitudinal slots diammetrically located relative to to each other, a pin on said rod extending transversely of the rod and said sleeve and projecting through said slots, a collar surrounding said sleeve for sliding movement on the sleeve periphery, said collar being connected to said rod by said pin, a stop on the end of said sleeve opposite said one end, and spring means interposed between said stop and collar to resist outward movement of said rod relative to said sleeve.

2. A hay baler as recited in claim 1 wherein said spring means comprises a pair of compression springs, one inside the other, surrounding said sleeve and wound in opposite directions to prevent interference between the coils of the respective springs.

3. A hay baler as recited in claim 1 wherein said second link has a normal retracted length, threaded means being provided to selectively establish said normal length.

4. A hay baler as recited in claim 1 wherein resilient means is provided between said sleeve and said rod to cushion retraction of the rod under the force of said compression springs after the second link has been extended.

5. A hay baler comprising a fore-and-aft extending bale chamber having a feed opening in one side wall and a longitudinal slot in a top portion of the chamber, a plunger reciprocal in said chamber from a retracted position forwardly of said opening to an extended position rearwardly thereof, a pivot pin carried on said plunger and having a vertical axis, access to said pin being provided by said slot, a hay receiving generally horizontal platform extending laterally from said one side wall and a bottom portion of said chamber, a track above said platform and bale chamber and extending generally perpendicular to the bale chamber, said track having a pair of spaced parallel track members, a feeder carriage mounted on said track and movable rectilinearly thereover toward and away from said bale chamber from a retracted position remote from said bale chamber to an extended position adjacent thereto, hay engageable fingers depending from said carriage, means mounting said fingers to extend generally vertically when said carriage is moved toward said bale chamber and to pivot to an inclined position on movement of the carriage away from the bale chamber, a bell crank, means pivotally mounting said bell crank for oscillating movement about a vertical axis, said mounting means being located spaced from said chamber one side wall and above said platform, said bell crank having a first leg and a second leg extending generally in horizontal planes, a rigid first link having one end pivotally connected to said carriage and an opposite end pivotally connected to said bell crank first leg, a second link having one end pivotally connected to said bell crank second leg and one location only of an opposite end pivotally connected to said pin on said plunger whereby when said plunger reciprocates said bell crank oscillates and said carriage is moved along said track, the pivotal connections for said first and second links having vertical axes and the relationship of said bell crank legs and said links being such that said second leg extends generally parallel to said bale chamber when said carriage is in said retracted position and generally perpendicular to the bale chamber when the carriage is in extended position, said second link comprising two, slidable telescopic portions providing a normal link length, which length is changeable upon extension of the second link, and spring means interposed between said telescopic portions to yieldably resist extension of the second link.

6. A hay baler comprising a fore-and-aft extending bale chamber having a feed opening in one side wall thereof, a plunger reciprocal in said bale chamber from a retracted position forwardly of said opening to an extended position rearwardly thereof, a hay receiving platform extending laterally from said one side wall, a track mounted above said platform and bale chamber and extending transverse to the bale chamber, a feeder carriage mounted on said track and movable rectilinearly thereover toward and away from said bale chamber, said carriage having a front section toward said bale chamber and a section remote therefrom, means connecting said front carriage section to said remote section for adjustment relative thereto toward and away from said bale chamber, hay engageable fingers depending from said carriage and mounted to extend generally vertically when said carriage is moved toward said bale chamber and to pivot to an inclined position on movement of the carriage away from the bale chamber, a bell crank having legs extending in a generally horizontal plane for swinging movement about a vertical axis, means pivotally mounting said bell crank, said mounting means being located spaced from said bale chamber one side wall and above said platform, a first link having one end pivotally connected to said carriage and an opposite end pivotally connected to one leg of said bell crank, a second link having one end pivotally connected to said plunger and an opposite end pivotally connected to the other leg of said bell crank, said second link comprising two slidable telescopic portions whereby the link may be extended, and spring means resisting extension of said second link.

7. A hay baler as recited in claim 6 wherein said hay engageable fingers includes front fingers mounted on said carriage front section which move into and out of said bale chamber on reciprocation of said carriage, the amount of penetration of said front fingers depending upon the particular adjustment of said front carriage section relative to said remote section.

8. A hay baler as recited in claim 6 wherein said first link is connected to said remote section of said carriage.

9. A hay baler comprising a fore-and-aft extending bale chamber having a feed opening in one side wall thereof, a plunger reciprocal in said bale chamber from a retracted position forwardly of said opening to an extended position rearwardly thereof, a hay receiving platform extending laterally from said one side wall, a track mounted above said platform and extending transverse to said bale chamber, a feeder carriage mounted on said track and movable rectilinearly thereover toward and away from said bale chamber, said carriage having a first section toward said bale chamber and a second section more remote therefrom, said first section at least having hay engageable means depending therefrom, means for reciprocating said carriage to move said hay engageable means into and out of said bale chamber between strokes of said plunger, and means connecting said first section of said carriage to said remote section for adjustment relative thereto in the direction of reciprocation of the carriage whereby the distance said hay engageable means moves into said bale chamber may be varied.

10. A hay baler comprising a fore-and-aft extending bale chamber having a feed opening in one side wall thereof, a plunger reciprocal in said bale chamber from a retracted position forwardly of said opening to an extended position rearwardly thereof, a hay receiving platform extending laterally from said one side wall, a track mounted above said platform and extending transverse to said bale chamber, a feeder carriage mounted on said track and movable rectilinearly thereover toward and away from said bale chamber, hay engageable means depending from said carriage, a bell crank mounted along side said one bale chamber side wall and having legs oscillatable about a vertical axis, means pivotally connecting said legs, means latching said legs to extend at a given angular relation to each other, said latching means being releasable if a force is applied to said legs exceeding a predetermined amount tending to pivot one leg away from the other leg, a stop limiting pivotal movement of said one leg in one direction, a first link connecting said one bell crank leg to said carriage, and a second link connecting the other bell crank leg directly to said plunger whereby when the plunger is reciprocated, the crank is oscillated and said carriage is reciprocated.

11. A hay baler comprising a fore-and-aft extending bale chamber having a feed opening in one side wall and a longitudinal slot in a top portion of the chamber, a plunger reciprocal in said chamber from a retracted position forwardly of said opening to an extended position rearwardly thereof, a pivot pin carried on said plunger and having a vertical axis, access to said pin being provided by said slot, a hay receiving generally horizontal platform extending laterally from said one side wall and a bottom portion of said chamber, a track above said platform and bale chamber and extending generally perpendicular to the bale chamber, a feeder carriage mounted on said track and movable rectilinearly thereover toward and away from said bale chamber from a retracted position remote from the bale chamber to an extended position adjacent thereto, hay engageable fingers depending from said carriage, means mounting said fingers to extend generally vertically when said carriage is moved toward said bale chamber and to pivot to an inclined position on movement of the carriage way from the bale chamber, a bell crank, means pivotally mounting said bell crank for oscillating movement about a vertical axis, said mounting means being located spaced from said chamber one side wall and above said platform, said bell crank having a first leg and a second leg, a rigid first link having one end pivotally connected to said carriage and an opposite end pivotally connected to said bell crank first leg, a second link having one end pivotally connected to said bell crank second leg and one location of an opposite end pivotally connected to said pin on said plunger whereby when said plunger reciprocates said bell crank oscillates and said carriage is moved along said track, the pivotal connections for said first and second links having vertical axes and the relationship of said bell crank legs and said links being such that said second leg extends generally parallel to said bale chamber when said carriage is in said retracted position and generally perpendicular to the bale chamber when the carriage is in said extended position.

References Cited in the file of this patent

UNITED STATES PATENTS

| | | |
|---|---|---|
| 2,720,073 | Freeman et al. | Oct. 11, 1955 |
| 2,926,601 | Tarbox et al. | Mar. 1, 1960 |
| 2,948,101 | Long | Aug. 9, 1960 |
| 3,040,508 | Nolt et al. | June 26, 1962 |

FOREIGN PATENTS

| | | |
|---|---|---|
| 625,232 | Great Britain | June 23, 1949 |
| 649,640 | Germany | Aug. 28, 1937 |